United States Patent
Hong et al.

(10) Patent No.: US 10,243,386 B2
(45) Date of Patent: Mar. 26, 2019

(54) POWER SUPPLY CIRCUIT IN ELECTRONIC DEVICE AND CONTROL METHOD THEREOF

(71) Applicant: Samsung Electronics Co., Ltd., Gyeonggi-do (KR)

(72) Inventors: Seung-Su Hong, Gyeonggi-do (KR); Seung-Beom Kang, Gyeonggi-do (KR); Chul-Kwi Kim, Seoul (KR); Jung-Hun Han, Gyeonggi-do (KR)

(73) Assignee: Samsung Electornics Co., Ltd (KR)

( * ) Notice: Subject to any disclaimer, the term of this patent is extended or adjusted under 35 U.S.C. 154(b) by 498 days.

(21) Appl. No.: 14/254,328

(22) Filed: Apr. 16, 2014

(65) Prior Publication Data

US 2014/0312701 A1    Oct. 23, 2014

(30) Foreign Application Priority Data

Apr. 23, 2013    (KR) .......................... 10-2013-0044718

(51) Int. Cl.
  *G01R 31/08* (2006.01)
  *H02J 7/00* (2006.01)
  *G06F 1/26* (2006.01)

(52) U.S. Cl.
  CPC .............. *H02J 7/008* (2013.01); *G06F 1/263* (2013.01); *G06F 1/266* (2013.01); *Y10T 307/696* (2015.04); *Y10T 307/747* (2015.04)

(58) Field of Classification Search
  CPC ....................................................... H02J 7/00
  USPC ............................................................ 307/66
  See application file for complete search history.

(56) References Cited

U.S. PATENT DOCUMENTS

| | | | |
|---|---|---|---|
| 6,058,034 A * | 5/2000 | Cummings | H02M 3/00 363/74 |
| 7,151,356 B1 | 12/2006 | Chen | |
| 8,788,852 B2 * | 7/2014 | Chun | G06F 1/266 320/126 |
| 2003/0030412 A1 | 2/2003 | Matsuda et al. | |
| 2007/0210750 A1 * | 9/2007 | Cha | G06F 1/26 320/114 |
| 2009/0198841 A1 * | 8/2009 | Yoshida | G06F 13/4295 710/16 |
| 2009/0212741 A1 | 8/2009 | Ferguson | |
| 2011/0163604 A1 * | 7/2011 | Hong | H02J 9/061 307/66 |

FOREIGN PATENT DOCUMENTS

| | | |
|---|---|---|
| EP | 2 402 864 | 1/2012 |
| KR | 1020090105459 | 10/2009 |
| KR | 1020110015742 | 2/2011 |

\* cited by examiner

*Primary Examiner* — Daniel Kessie
(74) *Attorney, Agent, or Firm* — The Farrell Law Firm, P.C.

(57) ABSTRACT

A power supply circuit in an electronic device is provided. The power supply circuit includes a connector configured to receive external power and IDentifier (ID) data, a first switch disposed between the connector and a system of the electronic device, a second switch connected to the system, and a controller configured to control ON and OFF states of each of the first and second switches based on the ID data.

20 Claims, 7 Drawing Sheets

POWER SUPPLY CIRCUIT IN ELECTRONIC DEVICE AND CONTROL METHOD THEREOF

PRIORITY

This application claims priority under 35 U.S.C. § 119(a) to a Korean Patent Application filed in the Korean Intellectual Property Office on Apr. 23, 2013 and assigned Serial No. 10-2013-0044718, the contents of which are incorporated herein by reference.

BACKGROUND OF THE INVENTION

1. Field of the Invention

The present invention relates generally to a power supply circuit in an electronic device and a control method thereof, and more particularly, to a power supply circuit that includes a battery and receives power supplied from the outside in an electronic device, and a control method thereof

2. Description of the Related Art

Figure 1:
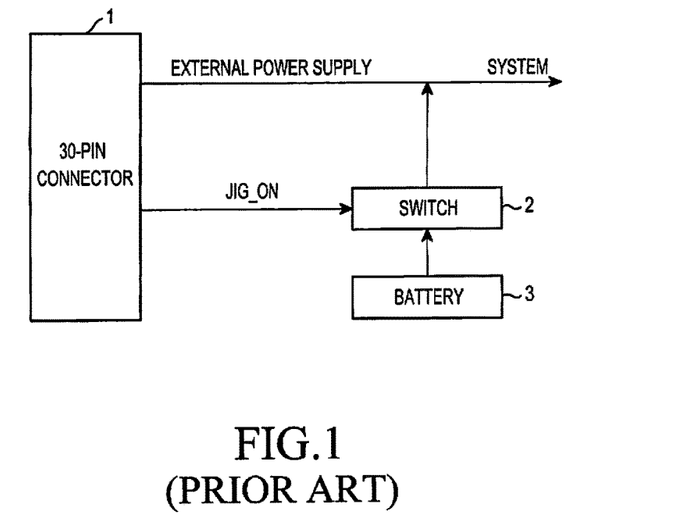
FIG. 1 is a block diagram of the conventional smart phone or tablet PC.

The use of smart phones and tablet Personal Computers (PCs) has risen dramatically in recent years. The conventional smart phone or tablet PC has an internal battery that supplies power for operation. The smart phone or tablet PC includes a power interface such as a 30-pin connector, through which it receives externally supplied power. In this case, the conventional smart phone or tablet PC may interrupt the power supply from the battery to the system thereof FIG. 1 is a block diagram of the conventional smart phone or tablet PC, which includes a 30-pin connector 1, a switch 2, and a battery 3.

The conventional smart phone or tablet PC receives the externally supplied power via the 30-pin connector 1, and delivers the received external power to the system thereof, at which time the power supply from the battery 3 to the system is interrupted. For example, the conventional smart phone or tablet PC may assign a JIG_ON signal to one pin of the 30-pin connector 1.

Upon receiving the JIG_ON signal, the switch 2 is controllable to be switched to the OFF state, in which case the battery 3 is disconnected from the system, interrupting the power supply from the battery 3 to the system.

Upon receiving the external power, the conventional smart phone or tablet PC interrupts all the connections between the battery 3 and the system. The conventional smart phone or tablet PC may undergo a process test before the battery is attached thereto. When there is a built-in battery, a JIG_ON signal may be assigned to a separate connector for the process test. In addition, the recent trend is that the 30-pin connector is replaced with a Universal Serial Bus (USB) connector.

Therefore, there is a need to develop a method of interrupting the power supply from the built-in battery for the USB connector to the system, and supplying the received external power to the system.

SUMMARY OF THE INVENTION

An aspect of the present invention is to address at least the above-mentioned problems and/or disadvantages and to provide at least the advantages described below. Accordingly, an aspect of embodiments of the present invention is to provide a power supply circuit capable of interrupting the power supply from a battery depending on IDentifier (ID) data and external power in an electronic device, and a control method thereof.

In accordance with an aspect of the present invention, there is provided a power supply circuit in an electronic device. The power supply circuit includes a connector configured to receive external power and ID data, a first switch disposed between the connector and a system of the electronic device, a second switch connected to the system, and a controller configured to control ON and OFF states of each of the first and second switches based on the ID data.

In accordance with an aspect of the present invention, there is provided a control method of a power supply circuit in an electronic device. The control method includes receiving external power via a connector, receiving ID data via the connector, and determining a connection state between a system of the electronic device and a battery for providing power to the system, based on the ID data.

In accordance with an aspect of the present invention, there is provided an electronic device including a connector configured to receive external power and ID data, a battery configured to supply power to a system of the electronic device, a first switch disposed between the connector and the system, a second switch disposed between the battery and the system, and a controller configured to control ON and OFF states of each of the first and second switches, based on the ID data and whether the external power is provided.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

The following description with reference to the accompanying drawings is provided to assist in a comprehensive understanding of embodiments of the invention as defined by the claims and their equivalents. It will be understood that the present invention is not restricted or limited to the embodiments. In addition, descriptions of well-known functions and constructions may be omitted for the sake of clarity and conciseness.

The terms and words used in the following description and claims are not limited to their dictionary meanings, but are merely used to enable a clear and consistent understanding of the invention. Accordingly, it should be apparent to those skilled in the art that the following description of embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 2:
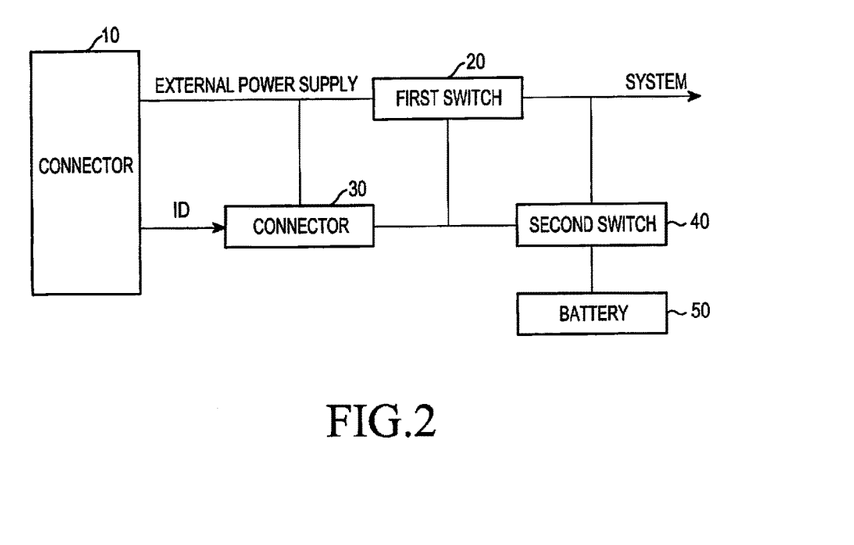
FIG. 2 is a block diagram of an electronic device according to an embodiment of the present invention.

FIG. 2 is a block diagram of an electronic device according to an embodiment of the present invention. The electronic device may include a connector 10, a first switch 20, a controller 30, a second switch 40, and a battery 50. The electronic device may be implemented in various forms such as a mobile communication terminal, a Personal Digital Assistant (PDA), a Personal Computer (PC), a smart phone, and a tablet PC, and it will be apparent to those of ordinary skill in the art that there is no restriction on the type of the electronic device.

The connector 10 may be a connector capable of connecting the electronic device to other electronic devices such as an external power supply and a computer. The connector 10 may perform data exchange between the electronic device and the other electronic devices. The connector 10 may supply the external power supplied from an external power supply to the electronic device. The connector 10 may be implemented in various forms such as a standard connector, a micro connector, and an on-the-go connector, and it will be apparent to those of ordinary skill in the art that there is no restriction on the type of the connector 10. In particular, if the electronic device is implemented as a smart phone or tablet PC, the connector 10 may be implemented as a micro USB connector which is provided with a voltage of about 5V, and may transmit and receive packet data defined by the standard.

The connector 10 may be connected to the first switch 20, and may also be connected to the controller 30. The first switch 20 and the controller 30 may be connected to the connector 10 in parallel. The connector 10 may have a connection terminal into which a plug may be inserted. The connection terminal of the connector 10 may include a plurality of pins. If the connector 10 is a micro USB connector, its connection terminal may include 11 pins. Separate data or power may be input to each of the plurality of pins of the connection terminal of the connector 10. For example, external power may be input to a first pin of the connector 10, and ID data may be input to a second pin thereof. If the connector 10 is implemented as a micro USB connector, the external power may be applied to a VBAT_2 pin of the micro USB connector. In addition, the ID data being input to the micro USB connector may be USB ID data.

The connector 10 may output the received external power to the first switch 20, and output the received ID data to the controller 30. The first switch 20 may be connected to the connector 10 to receive the external power, and may be connected to the system (not shown) to output the received external power to the system. The system may receive the external power which it uses for operation of the electronic device. The first switch 20 may be connected to the controller 30 and the second switch 40. As described above, if the first switch 20 is controlled to be switched to the ON state, the external power supplied from the connector 10 may be output to the system. If the first switch 20 is controlled to be switched to the OFF state, the external power supplied from the connector 10 may not be output to the system.

The controller 30 may control the ON/OFF state of the first switch 20. The controller 30 generates and outputs a control signal for controlling ON/OFF state of the first switch 20, thus to control the ON/OFF state of the first switch 20. For example, if the first switch 20 is implemented with a Field Effect Transistor (FET), the controller 30 may be connected to a gate terminal of the first switch 20. The controller 30 may control the ON/OFF state of the first switch 20 by changing a gate voltage applied to the gate terminal. For example, the controller 30 may control the first switch 20 to be switched to the OFF state, if it determines not to supply the external power to the system. If the controller 30 determines to supply the external power to the system, the controller 30 may control the first switch 20 to be switched to the ON state.

The second switch 40 may determine the connection state between the battery 50 and the system as ON state or OFF state. The controller 30 may also control the ON/OFF state of the second switch 40, thereby connecting or disconnecting the battery 50 to/from the system. For example, the controller 30 may control the second switch 40 to be switched to the OFF state if it determines not to supply power of the battery 50 to the system. If the controller 30 determines to supply power of the battery 50 to the system, the controller 30 may control the second switch 40 to be switched to the ON state.

The battery 50 may supply the power required for operation of the electronic device. The battery 50 may be detachably or fixedly mounted in the electronic device. The battery 50 may supply its power to the system if there is no external power, while charging itself with the external power.

The controller 30 may control the ON/OFF state of the first switch 20 and the ON/OFF state of the second switch 40 based on the received ID data and on whether the external power is provided.

Figure 3:
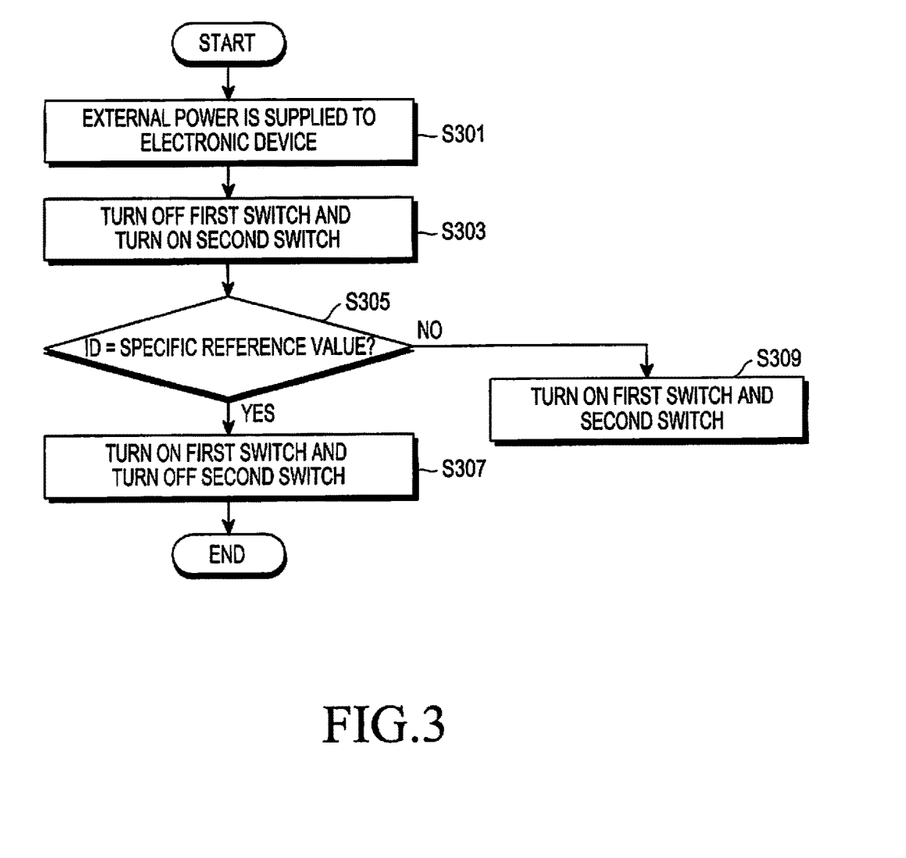
FIG. 3 illustrates a control method of a power supply circuit in an electronic device according to an embodiment of the present invention.

FIG. 3 illustrates a control method of a power supply circuit in an electronic device according to an embodiment of the present invention.

External power may be supplied to the electronic device in step S301. The controller 30 may be provided with the external power from the connector 10, as illustrated in FIG. 2. Accordingly, the controller 30 may determine whether the external power is provided. For example, the controller 30 may determine that the external power is provided if a level of power received on a line, to which the external power is applied from the connector 10, exceeds a threshold.

If it is determined that the external power is provided to the connector 10 in step S301, the controller 30 may control the first switch 20 to be switched to the OFF state, and control the second switch 40 to be switched to the ON state in step S303. In other words, the controller 30 may control the first switch 20 not to output the external power to the system (not shown). More specifically, when the external power is provided, the controller 30 may control the first switch 20 to be switched to the OFF state. The controller 30 may control the second switch 40 to be switched to the ON state. As a result, if it is determined that the external power is provided, the controller 30 may first control the switches 20 and 40 so that the external power may not be provided to the system and the power from the battery 50 may be provided to the system.

As the first switch 20 is controlled to be switched to the OFF state, the power provided from the battery 50 may be prevented from flowing backward to the connector 10.

The controller 30 may determine whether ID data has a specific reference value in step S305. In an embodiment, a reference value of the ID data may be a resistance value. The ID data may indicate the type of a device inserted into a terminal of the connector 10, or the type of data applied to the connector 10. For example, if the ID data has a first resistance value, it may indicate that the device inserted into the terminal of the connector 10 is a USB cable. As another example, if the ID data has a second resistance value, it may indicate that the external power applied to the connector 10 is for a test process.

If it is determined that the ID data has a specific resistance value (Yes in step S305), the controller 30 may control the first switch 20 to be switched to the ON state and control the second switch 40 to be switched to the OFF state in step S307. For example, it will be assumed that the specific resistance value is the second resistance value indicating that the external power applied to the connector 10 is for the test process. If it is determined that the ID data has the second resistance value, the controller 30 may control the second switch 40 to be switched to the OFF state. In other words, the controller 30 may control the switches 20 and 40 so that the battery 50 and the system may not be connected to each other.

For example, when the external power for the test process is provided, if the battery 50 is connected to the system, a test error is likely to occur. Accordingly, if the external power for the test process is provided, the battery 50 should not be connected to the system. The controller 30 may determine that the external power is for the test process, by determining whether the ID data has a specific resistance value. If the external power is for the test process, the controller 30 may control the second switch 40 to be switched to the OFF state so that the battery 50 may not be connected to the system.

As described above, in the test process, the battery 50 may not be connected to the system, so the probability of error occurring in the test process may be significantly reduced. In addition, the conventional electronic device has limitations that it should undergo the test process before the battery 50 is mounted therein. However, as for the electronic device disclosed by the invention, even after the battery 50 is mounted in the electronic device, the battery 50 may not be connected to the system in the aforesaid manner, which averts time limitations of a process of mounting the battery 50

In addition, as the first switch 20 is controlled to be switched to the ON state, the external power may be provided to the system.

If the ID data does not have the specific resistance value (No in step S305), the controller 30 may control the first switch 20 to be switched to the ON state and control the second switch 40 to be switched to the ON state in step S309. In other words, the controller 30 may control the switches 20 and 40 so that both of the external power and the power from the battery 50 may be provided to the system.

For example, it will be assumed that the specific resistance value is the second resistance value indicating that the external power applied to the connector 10 is for the test process. The controller 30 may control the second switch 40 to be switched to the ON state, if it determines that the ID data has the first resistance value indicating that the type of a device inserted into a terminal of the connector 10 is a USB cable. In other words, the controller 30 may control the switches 20 and 40 so that the battery 50 and the system may be connected to each other. For example, if the type of the device inserted into the terminal of the connector 10 is a USB cable, the battery 50 does not need to be disconnected from the system, so the controller 30 may control the switches 20 and 40 so that both of the power provided from the battery 50 and the external power may be provided to the system.

The controller 30 may control the switches 20 and 40 so that the battery 50 may not be connected to the system when the external power is for the test process, among various cases.

Figure 4:
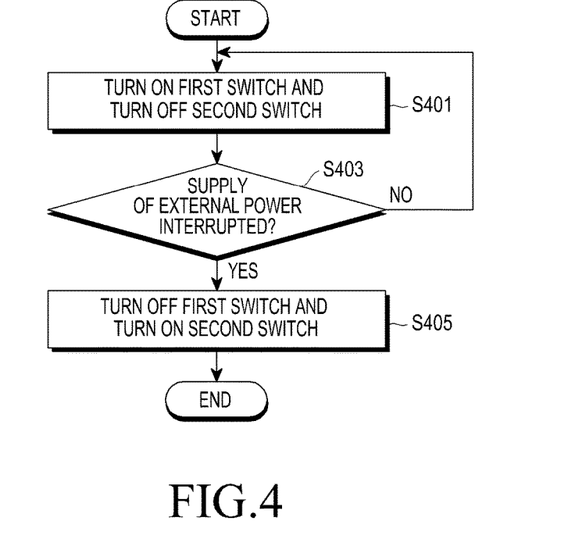
FIG. 4 illustrates a control method of a power supply circuit in an electronic device according to another embodiment of the present invention.

FIG. 4 illustrates a control method of a power supply circuit in an electronic device according to another embodiment of the present invention. The control method in FIG. 4 may follow the control method in FIG. 3.

External power and ID data may be input to the electronic device. The controller 30 may determine that the ID data has a specific value. In this case, the controller 30 may control the first switch 20 to be switched to the ON state and control the second switch 40 to be switched to the OFF state in step S401. In other words, the controller 30 may control the switches 20 and 40 so that only the external power may be provided to the system and the power provided from the battery 50 may not be provided to the system. Accordingly, the battery 50 and the system may not be connected to each other.

In other words, the controller 30 may determine based on the ID data that the above process corresponds to the situation in which the battery 50 should not be connected to the system. In this case, the controller 30 may control the second switch 40 between the battery 50 and the system to be switched to the OFF state.

The controller 30 may determine whether the supply of the external power is interrupted in step S403. The controller 30 may receive the external power provided from the connector 10, as illustrated in FIG. 2. Accordingly, the controller 30 may determine whether the supply of the external power is interrupted. For example, the controller 30 may determine that the supply of the external power is interrupted, if a level of power received on a line, to which the external power is applied from the connector 10, is less than or equal to a threshold (Yes in step S403).

If it is determined that the external power is continuously provided (No in step S403), the controller 30 controls the first switch 20 to be switched to the ON state and control the second switch 40 to be switched to the OFF state. In other words, the controller 30 prevents the battery 50 and the system from being disconnected from each other.

If it is determined that the supply of the external power is interrupted (Yes in step S403), the controller 30 may control the first switch 20 to be switched to the OFF state and control the second switch 40 to be switched to the ON state in step S405. In other words, the controller 30 may control the second switch 40 so that the battery 50 and the system may be connected to each other, and may control the battery 50 to provide its power to the system. In addition, by controlling the first switch 20 to be switched to the OFF state, the controller 30 may prevent the power provided from the battery 50 from flowing backward to the connector 10.

Figure 5:
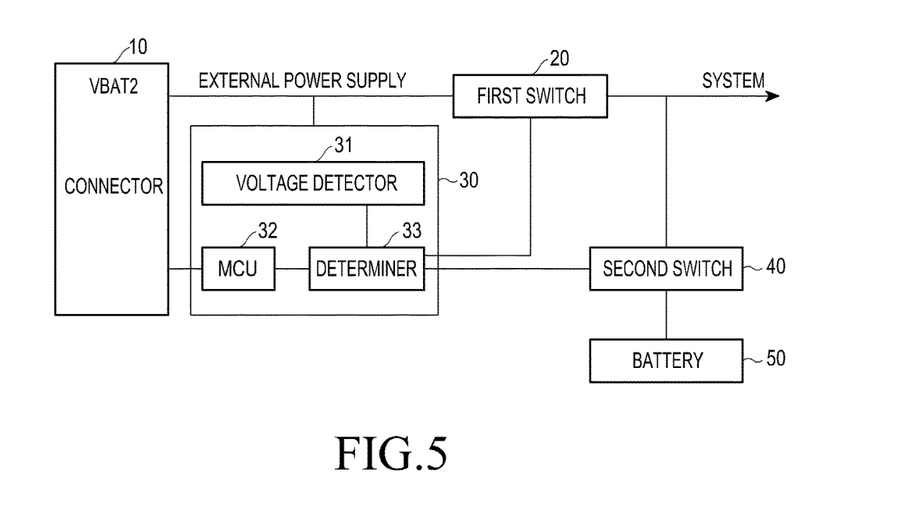
FIG. 5 is a block diagram of an electronic device according to another embodiment of the present invention.

FIG. 5 is a block diagram of an electronic device according to another embodiment of the present invention.

As illustrated in FIG. 5, the electronic device may include a connector 10, a first switch 20, a controller 30, a second switch 40, and a battery 50. The controller 30 may include a voltage detector 31, a Micro Controller Unit (MCU) 32, and a determiner 33.

The controller 10 may receive external power and output it to the voltage detector 31. The voltage detector 31 may detect a voltage of the external power, and output the detected voltage value of the external power to the determiner 33. In this case, the determiner 33 determines whether the external power is provided, upon receiving a detected voltage value that exceeds a voltage Vref. The determiner 33 may determine that the external power is not provided, upon receiving a detected voltage value that is less than or equal to the voltage Vref.

Based on its detected voltage value of the external power, the voltage detector 31 may directly output, to the determiner 33, information indicating whether the external power is provided. For example, the voltage detector 31 may determine that the external power is provided, if it is determined that its detected voltage value exceeds the voltage Vref. If it is determined that the detected voltage value is less than or equal to the voltage Vref, the voltage detector 31 may determine that the external power is not provided. The voltage Vref may be, for example, 3.1V.

The MCU 32 may receive ID data from the connector 10. The MCU 32 may determine whether the ID data has a specific reference value.

In an embodiment, a reference value of the ID data may be a resistance value. The MCU 32 may detect a resistance value of the ID data, and determines whether it corresponds to a specific resistance value. For example, the MCU 32 may determine that the resistance value of the ID data is a specific resistance value, if a difference between the resistance value of the ID data and the specific resistance value is less than a threshold.

The MCU 32 may generate a JIG_ON signal and output it to the determiner 33, if it determines that the ID data has a specific resistance value. The MCU 32 may output no JIG_ON signal, if it determines that the ID data does not have a specific resistance value.

While receiving the JIG_ON signal, if it is determined that the external power is provided, the determiner 33 may control the first switch 20 to be switched to the ON state and control the second switch 40 to be switched to the OFF state. More specifically, the determiner 33 may generate an ON-state control signal and output it to the first switch 20. For example, if the first switch 20 is implemented with an FET switch, the determiner 33 may apply a gate voltage so as to control the first switch 20 to be switched to the ON state. The determiner 33 may generate an OFF-state control signal, and output it to the second switch 40. For example, if the second switch 40 is implemented with an FET switch, the determiner 33 may apply a gate voltage so as to control the second switch 40 to be switched to the OFF state.

While receiving no JIG_ON signal, if it is determined that the external power is provided, the determiner 33 may control both of the first and second switches 20 and 40 to be switched to the ON state.

More specifically, the determiner 33 may generate an ON-state control signal and output it to the first switch 20. For example, if the first switch 20 is implemented with an FET switch, the determiner 33 may apply a gate voltage so as to control the first switch 20 to be switched to the ON state. Similarly, the determiner 33 may generate an ON-state control signal and output it to the second switch 40. For example, if the second switch 40 is implemented with an FET switch, the determiner 33 may apply a gate voltage so as to control the second switch 40 to be switched to the ON state.

In addition, if it is determined that the external power is not provided, the determiner 33 may control the first switch 20 to be switched to the OFF state, and control the second switch 40 to be switched to the ON state.

More specifically, the determiner 33 may generate an OFF-state control signal and output it to the first switch 20. For example, if the first switch 20 is implemented with an FET switch, the determiner 33 may apply a gate voltage so as to control the first switch 20 to be switched to the OFF state. The determiner 33 may generate an ON-state control signal and output it to the second switch 40. For example, if the second switch 40 is implemented with an FET switch, the determiner 33 may apply a gate voltage so as to control the second switch 40 to be switched to the ON state.

The above-described process may be summarized in Table 1 below.

TABLE 1

| JIG_ON Signal | External Power | First Switch | Second Switch |
|---|---|---|---|
| ○ | ○ | ON | OFF |
| x | ○ | ON | ON |
| x | x | OFF | ON |

Figure 6:
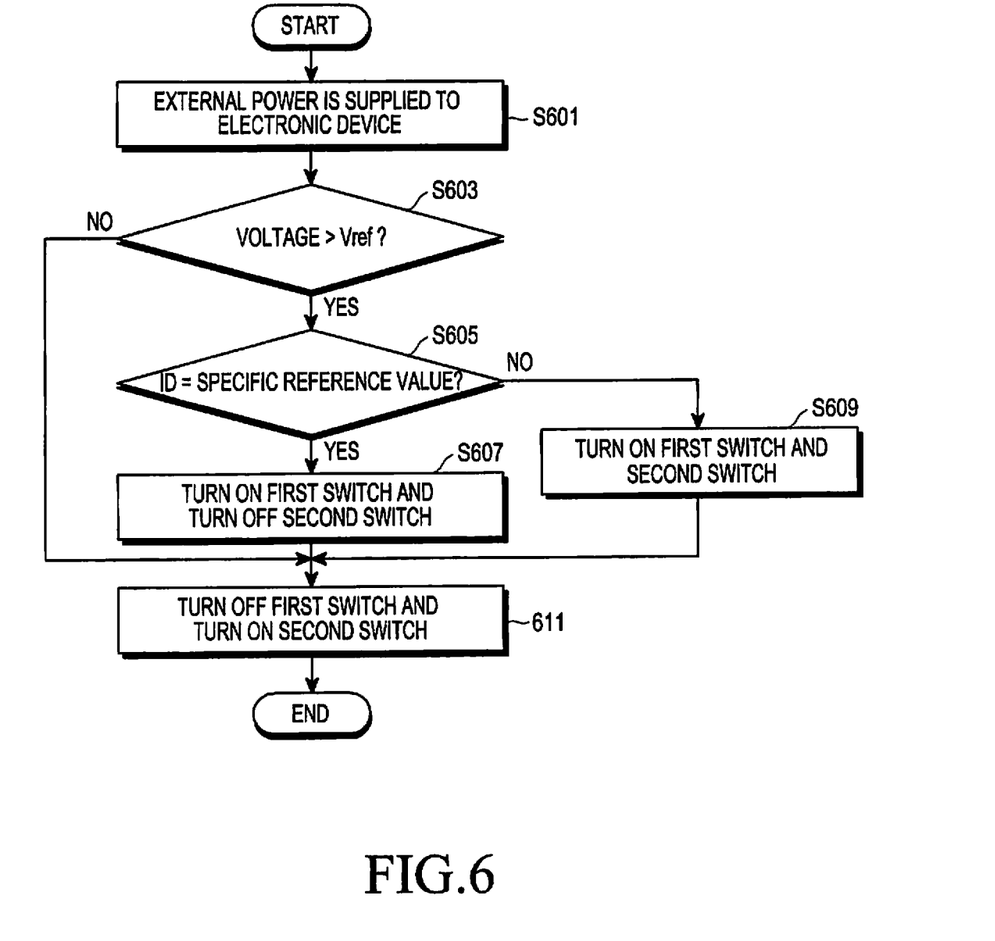
FIG. 6 illustrates a control method of a power supply circuit in an electronic device according to another embodiment of the present invention.

FIG. 6 illustrates a control method of a power supply circuit in an electronic device according to another embodiment of the present invention.

External power may be supplied to the electronic device in step S601. The voltage detector 31 or the determiner 33 may determine whether a voltage of the external power is greater than a voltage Vref in step S603.

If it is determined that the voltage of the external power is less than or equal to the voltage Vref (No in step S603), the controller 30 may determine that the external power is not provided. In this case, the controller 30 may control the first switch 20 to be switched to the OFF state and control the second switch 40 to be switched to the ON state in step S611, enabling the battery 50 to provide its power to the system.

If it is determined that the voltage of the external power is greater than the voltage Vref (Yes in step S603), the MCU 32 may determine whether the ID data has a specific reference value in step S605. If it is determined that the ID data has a specific reference value (Yes in step S605), the MCU 32 may generate and output a JIG_ON signal. While receiving the JIG_ON signal, if it is determined that the external power is provided, the determiner 33 may control the first switch 20 to be switched to the ON state and control the second switch 40 to be switched to the OFF state in step S607. Accordingly, the determiner 33 may control the switches 20 and 40 so that the battery 50 and the switch may not be connected to each other.

If it is determined that the ID data does not have the specific reference value (No in step S605), the MCU 32 does not generate the JIG_ON signal. Upon failure to receive a JIG_ON signal even though it is determined that the external power is provided, the determiner 33 may control both of the first and second switches 20 and 40 to be switched to the ON state in step S609. As a result, both of the power provided from the battery 50 and the external power may be controlled to be provided to the system.

Figure 7:
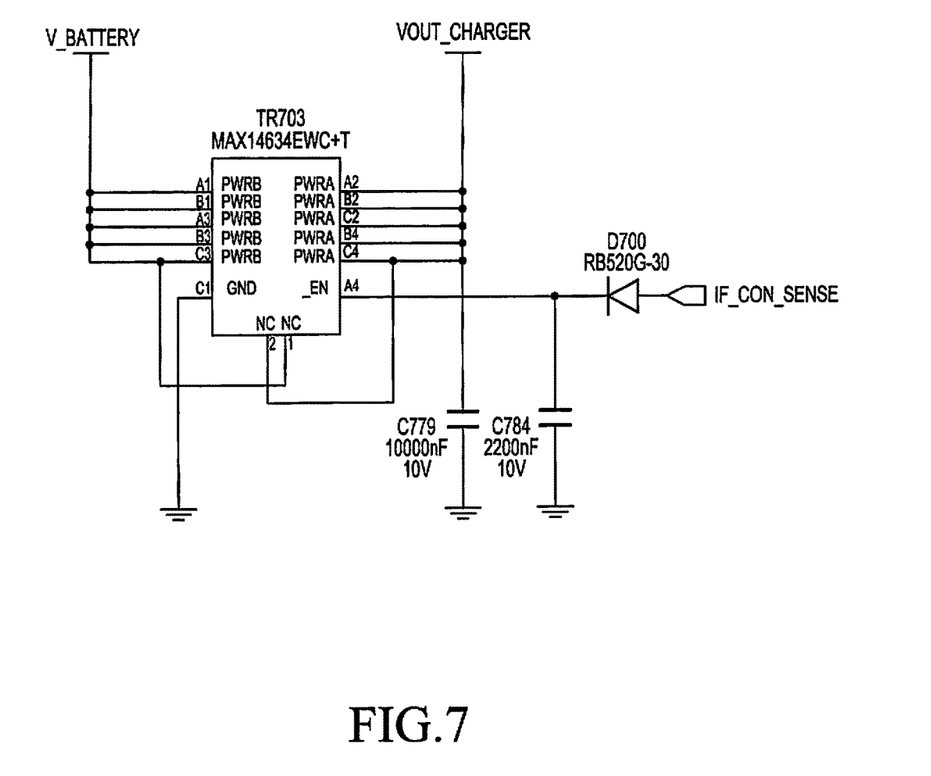
FIG. 7 illustrates a circuit diagram of a second switch and its peripheral units according to an embodiment of the present invention.

FIG. 7 illustrates a circuit diagram of a second switch and its peripheral units according to an embodiment of the present invention. As illustrated, the second switch (TR703 MAX14634EWC+T) is connected to V_BATTERY, which may indicate that V_BATTERY is connected to the battery 50. In addition, the second switch (TR703 MAX 14634EWC+T) is connected to VOUT_CHARGER, which may indicate that VOUT_CHARGER is connected to the system. The second switch (TR703 MAX14634EWC+T) is also connected to IF_CON_SENSE, which may indicate that IF_CON_SENSE is connected to the controller 30 or the determiner 33. Between IF_CON_SENSE and the second switch (TR703 MAX14634EWC+T) may be connected an amplifier (D700 RB520G-30), which may amplify an output signal from the controller 30 or the determiner 33 with a gain, and output it to the second switch (TR703 MAX14634EWC+T).

Figure 8:
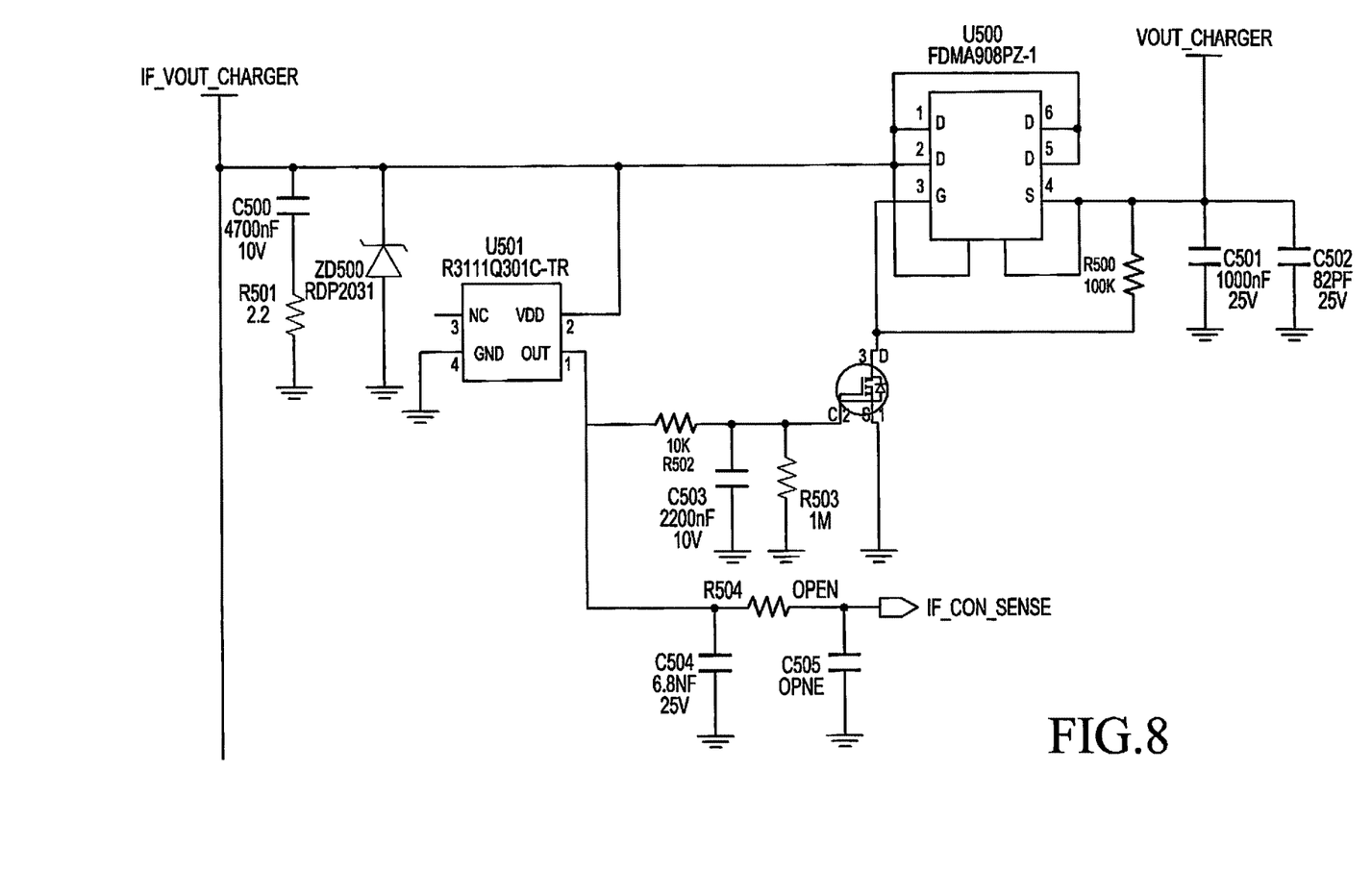
FIG. 8 illustrates a circuit diagram of a first switch, a controller and their peripheral units according to an embodiment of the present invention.

FIG. 8 illustrates a circuit diagram of a first switch, a controller and their peripheral units according to an embodiment of the present invention.

As illustrated, a comparator (U501R3111Q301C+TR) is connected to IF_VOUT_CHARGER, which may indicate that IF_VOUT_CHARGER is connected to an external power supply line of the connector 10. In addition, the first switch (U500FDMA908PZ-1) is connected to IF_CON_SENSE, which may indicate that IF_CON_SENSE is connected to the controller 30 or the determiner 33. Between IF_CON_SENSE and the first switch (U500FDMA908PZ-1) may be disposed the determiner 33 comprised of resistors and capacitors. The first switch (U500FDMA908PZ-1) is connected to VOUT_CHARGER, which may indicate that VOUT_CHARGER is connected to the system.

Figure 9:
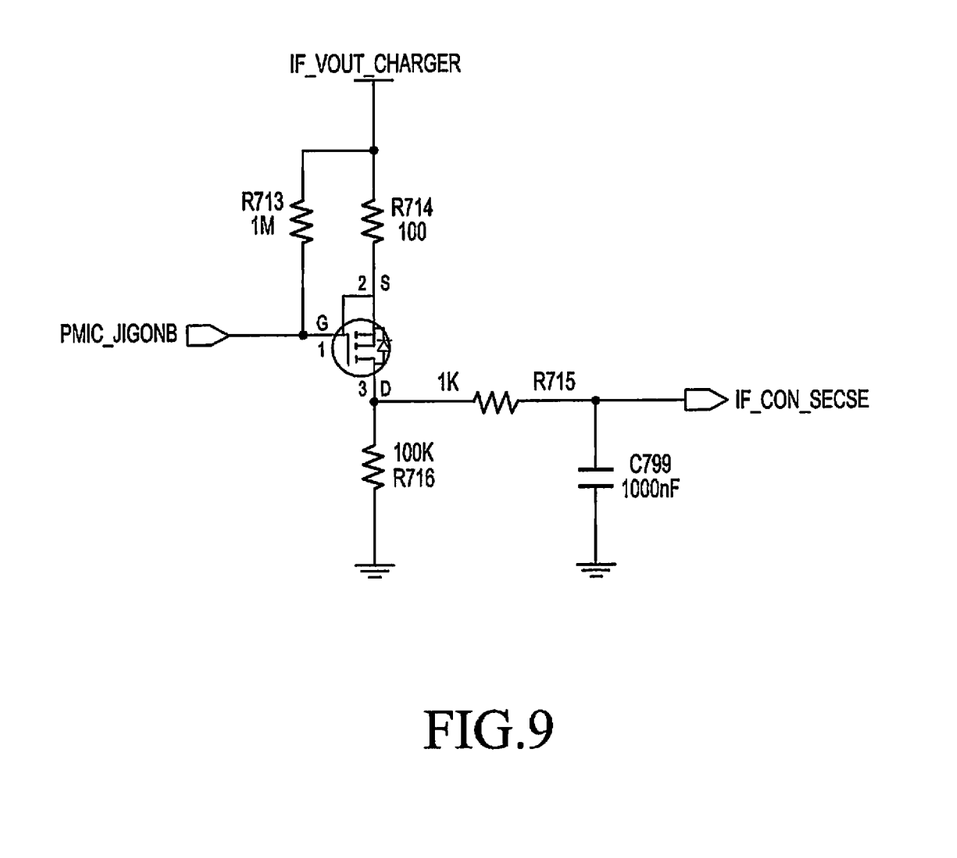
FIG. 9 illustrates a circuit diagram of a determiner and its peripheral units.

FIG. 9 illustrates a circuit diagram of a determiner and its peripheral units. As illustrated, the determiner is connected to PMIC_JIONB, which may indicate that PMIC_JIONB is connected to the MCU. In addition, the determiner is connected to IF_VOUT_CHARGER, which may indicate that IF_VOUT_CHARGER is connected to an external power supply line of the connector 10. An output terminal of the determiner may be represented as IF_CON_SENSE.

The circuit diagrams of FIGS. 7 to 9 are merely illustrative, and it will be apparent to those of ordinary skill in the art that components of the circuit diagrams may be replaced and modified to perform the same functions. In addition, it is obvious that the scope of the invention is not limited to the circuit diagrams of FIGS. 7 to 9.

As is apparent from the foregoing description, embodiments of the present invention may provide a power supply circuit capable of interrupting the power supply from a battery depending on ID data and external power in an electronic device, and a control method thereof. Accordingly, electronic devices with a USB connector may be provided, contributing to miniaturization and standardization of products such as a smart phone or tablet PC.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A power supply circuit in an electronic device, comprising:
   a connector configured to receive external power for a test process and identifier (ID) data;
   a first switch disposed between the connector and a system of the electronic device;
   a second switch disposed between a battery and the system; and
   a controller configured to:
      determine whether a voltage of the external power is greater than a set voltage,
      control the first switch so that a state of the first switch becomes ON, in response to the voltage of the external power being greater than the set voltage,
      control the first switch so that the state of the first switch becomes OFF, in response to the voltage of the external power not being greater than the set voltage,
      control the second switch so that a state of the second switch becomes ON, in response to the voltage of the external power being greater than the set voltage and the ID data not having a specific reference value, and
      control the second switch so that the state of the second switch becomes OFF, in response to the voltage of the external power being greater than the set voltage and the ID data having the specific reference value.

2. The power supply circuit of claim 1, wherein the controller is further configured to determine whether the external power is provided to the connector.

3. The power supply circuit of claim 2, wherein the controller is further configured to:
   compare a voltage on a line, to which the external power is applied from the connector, with the set voltage, and
   determine whether the external power is provided, based on results of the comparison.

4. The power supply circuit of claim 3, wherein the controller includes a voltage detector for detecting the voltage on the line, to which the external power is applied from the connector, and
   wherein the voltage detector determines that the external power is provided, if the voltage on the line is greater than the set voltage, and the voltage detector determines that the external power is not provided, if the voltage on the line is less than or equal to the set voltage.

5. The power supply circuit of claim 1, further comprising the battery for supplying power to the system.

6. The power supply circuit of claim 5, wherein the controller is further configured to, if it is determined that the external power is provided to the connector and the ID data has the specific reference value control the connector to be connected to the system to provide the external power to the system, and control to disconnect the battery from the system.

7. The power supply circuit of claim 6, wherein the controller is further configured to control the first switch to be switched to the ON state and control the second switch to be switched to the OFF state.

8. The power supply circuit of claim 5, wherein the controller is further configured to, if it is determined that the external power is provided to the connector and the ID data does not have the specific reference value, control the connector to be connected to the system to provide the external power to the system, and control the battery to be connected to the system.

9. The power supply circuit of claim 8, wherein the controller is further configured to control the first switch to be switched to the ON state, and control the second switch to be switched to the ON state.

10. The power supply circuit of claim 5, wherein the controller is further configured to, if it is determined that the external power is not provided to the connector, control the connector to be disconnected from the system, and control the battery to be connected to the system, to provide power from the battery to the system.

11. The power supply circuit of claim 10, wherein the controller is further configured to control the first switch to be switched to the OFF state and control the second switch to be switched to the ON state.

12. The power supply circuit of claim 1, wherein the controller includes:
   a Micro Controller Unit (MCU) configured to output a JIG_ON signal, if the ID data received via the connector has the specific reference value; and
   a determiner configured to generate and output a control signal for the first and second switches based on whether the JIG_ON signal is received from the MCU and whether the external power is provided to the connector.

13. The power supply circuit of claim 1, wherein the connector is a micro Universal Serial Bus (USB) connecter, and the external power is input to a VBAT2 pin of the micro USB connector.

14. A control method of a power supply circuit in an electronic device, comprising:
   receiving external power for a test process via a connector;
   receiving identifier (ID) data via the connector;
   determining whether a voltage of the external power is greater than a set voltage;
   controlling a first switch so that a state of the first switch becomes ON, in response to the voltage of the external power being greater than the set voltage, the first switch disposed between the connector and a system of the electronic device;
   controlling the first switch so that the state of the first switch becomes OFF, in response to the voltage of the external power being not greater than the set voltage:
   controlling a second switch so that a state of the second switch becomes ON, in response to the voltage of the external power being greater than the set voltage and the ID data not having a specific reference value, the second switch disposed between a battery and the system, based on the voltage of the external power being greater than the set voltage; and
   controlling the second switch so that the state of the second switch becomes OFF, in response to the voltage of the external power being greater than the set voltage and the ID data having the specific reference value.

15. The control method of claim 14, wherein determining the voltage of the external power comprises:
   comparing the voltage on a line, to which the external power is applied from the connector, with the set voltage, and
   determining whether the external power is provided to the connector, based on the comparison results.

16. The control method of claim 15, wherein determining the voltage of the external power comprises:
   determining that the external power is provided to the connector, based on the voltage on the line being greater than the set voltage, and determining that the external power is not provided, based on the voltage on the line being less than or equal to the set voltage.

17. The control method of claim 14, further comprising:
   in response to determining that the external power is provided to the connector and the ID data has the specific reference value, controlling the connector to be connected to the system to provide the external power to the system, and controlling the battery to be disconnected from the system.

18. The control method of claim 14, further comprising:
   in response to determining that the external power is not provided to the connector, controlling the connector to be disconnected from the system, and controlling the battery to be connected to the system to provide power from the battery to the system.

19. The control method of claim 14, further comprising:
   outputting a JIG_ON signal, based on the ID data received via the connector having the specific reference value; and
   determining the connection state between the system and the battery, based on whether a JIG_ON signal is received and whether the external power is provided to the connector.

20. The control method of claim 14, further comprising:
   in response to determining that the external power is provided and the ID data does not have the specific reference value, controlling the connector to be connected to the system to provide the external power to the system, and controlling the battery to be connected to the system.

* * * * *